(12) United States Patent
Drake et al.

(10) Patent No.: US 6,598,928 B1
(45) Date of Patent: Jul. 29, 2003

(54) SUN VISOR ASSEMBLY

(75) Inventors: Brett E. Drake, Coldwater, MI (US); Derik Reichhart, Coldwater, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/054,803

(22) Filed: Jan. 23, 2002

(51) Int. Cl.$^7$ ................................. B60J 3/00
(52) U.S. Cl. ..................... 296/97.1; 296/97.9
(58) Field of Search ................... 296/97.1, 97.5, 296/97.8, 97.9, 97.11, 97.12, 97.13

(56) References Cited

U.S. PATENT DOCUMENTS

| | | | |
|---|---|---|---|
| 4,828,314 A | * 5/1989 | Gavagan | 296/97.8 |
| 4,982,991 A | * 1/1991 | Lawassani et al. | 296/97.1 |
| 5,042,867 A | 8/1991 | Crotty, III et al. | 296/97.8 |
| 5,365,416 A | 11/1994 | Peterson | 362/135 |
| 5,580,118 A | 12/1996 | Crotty, III | 296/97.12 |
| 6,033,005 A | * 3/2000 | Crotty, III | 296/97.1 |
| 6,131,985 A | * 10/2000 | Twietmeyer et al. | 296/97.1 |
| 6,199,934 B1 | * 3/2001 | Sturt | 296/97.1 |

* cited by examiner

*Primary Examiner*—D. Glenn Dayoan
*Assistant Examiner*—Lori L Coletta
(74) *Attorney, Agent, or Firm*—Rader, Fishman & Grauer, PLLC

(57) ABSTRACT

A sun visor assembly is provided that includes a core having a peripheral edge and a foundation folded over the core and fastened to itself to secure the core substantially within the foundation. The core includes a stiffening member and a frame member having an integrally formed pin member to detachably secure the sun visor to a retainer clip. At least a portion of the foundation extends beyond the peripheral edge of the core to define an edge of the sun visor. An upholstery cover is provided over the foundation and forms an exterior surface of the sun visor. In relatively long sun visors, the integrally formed pin member advantageously provides the structural integrity needed to substantially prevent torsional deformation of the sun visor assembly as it is moved from a storage position adjacent a vehicle headliner to a use position adjacent the vehicle windshield.

16 Claims, 7 Drawing Sheets

SUN VISOR ASSEMBLY

BACKGROUND OF THE INVENTION

1. Field of the Invention

The present invention relates generally to sun visors for vehicles and, more particularly, to sun visors having a two piece core.

2. Description of the Related Art

It is well known to provide a sun visor for the windshield of a vehicle, wherein the sun visor is mounted on a roof panel of the vehicle for movement between a storage position adjacent the vehicle headliner, a first use position adjacent the windshield, and a second use position adjacent a side-door window opening.

One known sun visor assembly includes an inner core board of pressed wood attached to a molded plastic extender blade that slides into an out of the sun visor assembly for extending the sun blocking protection of the sun visor. An outer covering of foam-backed cloth, which is adhered to a kraft-paper foundation, is folded over the core board and is edge sewn along a seam circumjacent the periphery of the core board. A separate pin member is secured to the foundation and is used to secure the sun visor in a retainer clip on the vehicle headliner, as is known in the art.

Another known sun visor assembly includes a molded plastic inner core member and an outer covering assembly folded over the plastic core in the manner previously described. The plastic core member is provided with an extender blade for extending the sun blocking protection of the sun visor and an integrally formed pin member to secure the sun visor to the vehicle headliner.

Vehicles having large windshields, such as transport trucks or the like, require relatively long sun visor assemblies. Therefore, a relatively long inner core is required to satisfactorily support the sun visor foundation. However, simply lengthening the inner core of known sun visor assemblies to accommodate the length of the foundation does not provide adequate structural integrity to resist deformation of the sun visor assembly. Unless adequately supported, a sun visor assembly is subject to deformation from the torsional forces imposed by a vehicle occupant moving the sun visor from the storage position to one of the use positions. For example, a relatively long sun visor assembly employing a clip member formed independent of the core member, undesirably deforms proximate the clip member as the sun visor is rotated from the storage position to first use position. In another example, a relatively long sun visor assembly employing a molded plastic core member undesirably deforms through the core's cross section, due to the flexibility of the plastic. Therefore, a sun visor core is required for use with relatively long sun visor assemblies to substantially prevent the sun visor assembly from deforming during use.

SUMMARY OF THE INVENTION

In a preferred embodiment of the present invention, a sun visor assembly is provided that includes an inner core having a stiffening member and a frame member. The frame member includes an integrally formed pin member to detachably secure the sun visor to a retainer clip. A foundation is folded over the core and is fastened to itself to secure the core substantially within the foundation. At least a portion of the foundation extends beyond a peripheral edge of the core to define an edge of the sun visor. The sun visor assembly further includes an upholstery cover covering the foundation that forms an exterior surface of the sun visor.

The stiffening member may be substantially longer than the frame member and/or substantially similar in length to the foundation. This advantageously allows the frame member to be substantially shorter than overall length of the core, providing significant savings in material. The sun visor core of the present invention is advantageously suited for use in a sun visor assembly having a relatively long length, without undesirably compromising the structural integrity of the sun visor assembly.

Various additional aspects and advantages of this invention will become apparent to those skilled in the art from the following detailed description of the preferred embodiment, when read in light of the accompanying drawings.

DESCRIPTION OF THE PREFERRED EMBODIMENT

Figure 1:
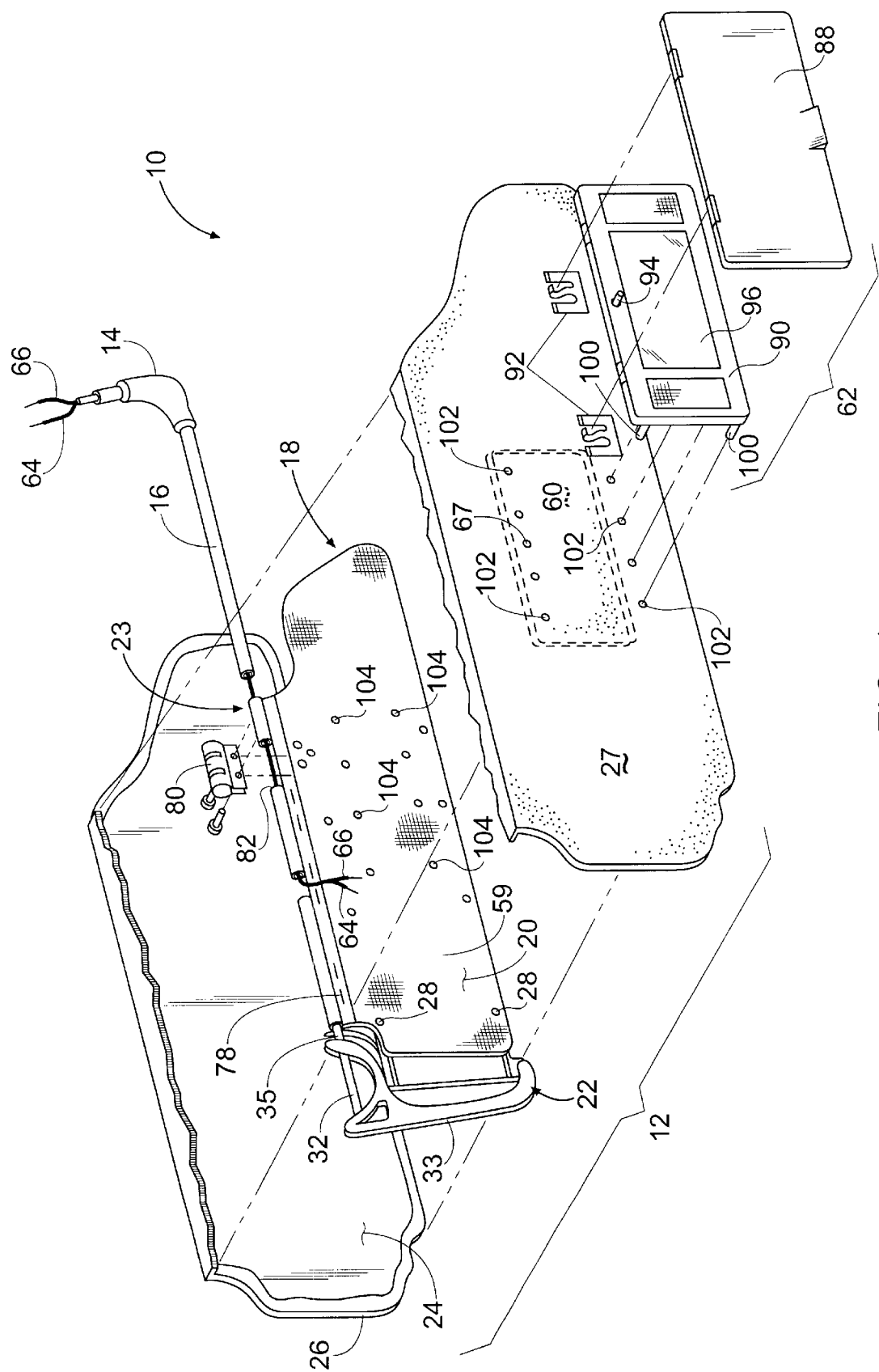
FIG. 1 is an exploded perspective view of a sun visor assembly according to a preferred embodiment of the present invention.

Referring now to the drawings, the preferred embodiments of the present invention are shown in detail. Referring to FIG. 1, there is shown a sun visor assembly 10 that generally includes a sun visor body 12 that is operably connected to a vehicle by a mounting bracket assembly 14. Mounting bracket assembly 14 secures sun visor assembly 10 to a vehicle roof panel and/or headliner and permits sun visor assembly 10 to be pivoted about a substantially vertical axis from a storage position proximate the front windshield to a first use position proximate a side window. As is known in the art, sun visor assembly 10 is rotatably supported on a support shaft 16 extending from mounting bracket assembly 14 such that sun visor assembly 10 may also be pivoted about a substantially horizontal axis between the storage position and a second use position adjacent the front windshield.

Sun visor body 12 includes a core 18 that functions as the base structure upon which other components of sun visor assembly 10 are assembled. As illustrated in FIG. 1, core 18 includes a stiffening member 20, a frame member 22, and a shaft holder or hinge 23 that is secured to stiffening member 20 for receiving support shaft 16 therein. Body 12 further includes a substantially planar foundation 24, preferably made of kraft paper or other similar material, that is folded over core 18 and secured substantially along its perimeter to form a peripheral edge 26. Foundation 24 is preferably secured together by glue or similar adhesive, but may be secured together by other means known in the art, such as heat sealing. An upholstery cover 27 is disposed over foundation 24 and forms an exterior surface of the sun visor assembly 10. Upholstery cover 27 is preferably a foam backed cloth, but may include other materials known in the art, such as vinyl or the like.

Figure 4A:
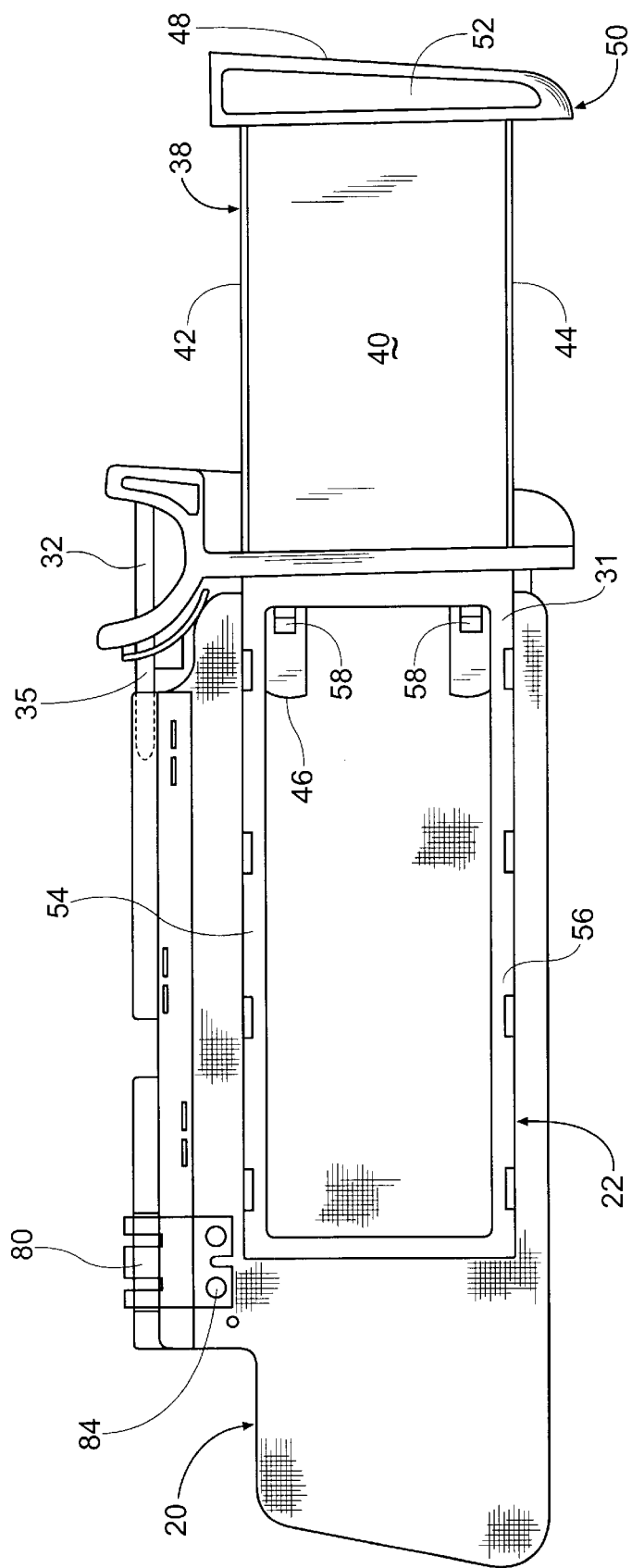
FIG. 4A is a rear plan view of the core illustrated in FIG. 1 with the optional extender blade shown in an extended position.
Figure 4B:
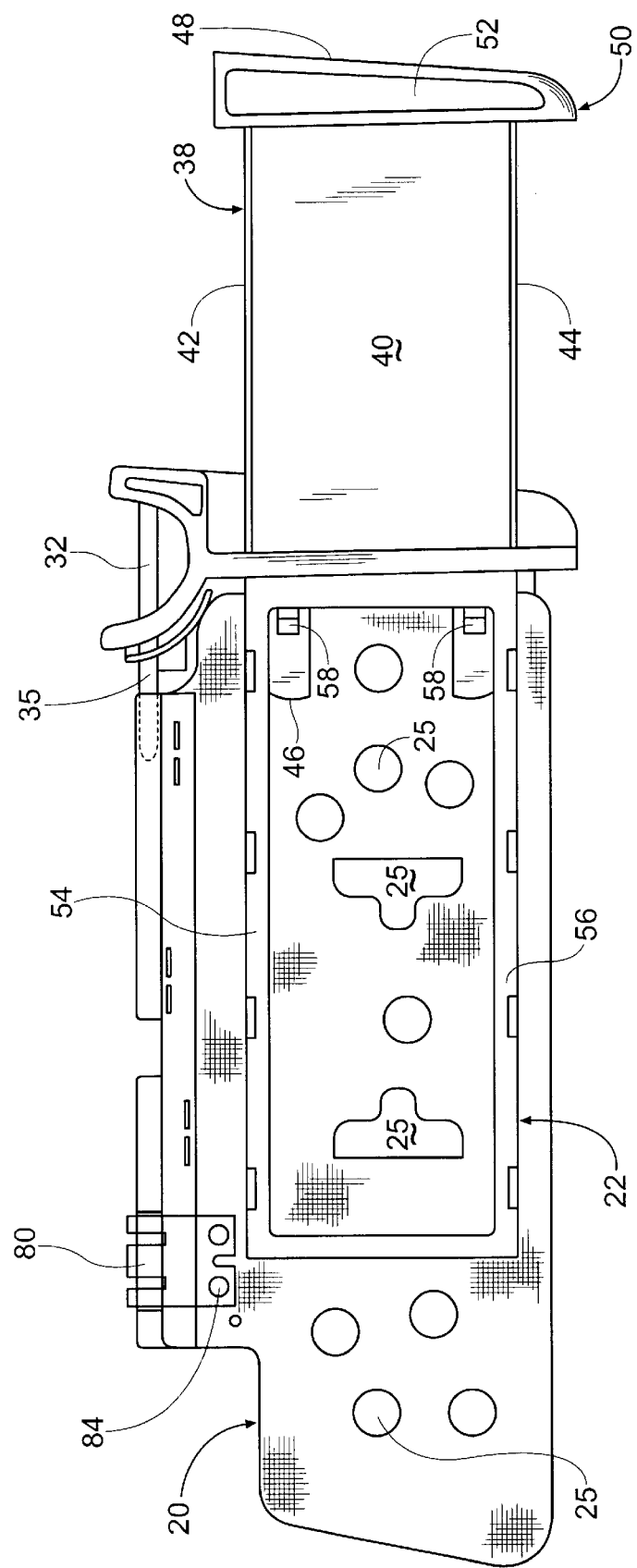
FIG. 4B is a rear elevational view of an alternate embodiment of the core with the optional extender blade shown in the extended position.

Stiffening member 20 is formed of a substantially rigid material, such as "SUPERWOOD®," (a registered trademark of Georgia Pacific Corporation) which is a type of hardboard. Stiffening member 20 may be solid, as illustrated in FIG. 4A, or may include a plurality of apertures or other cut-out formations 25, as illustrated in FIG. 4B, to reduce the weight of stiffening member 20 and/or facilitate the attachment of additional features, such as a mirror assembly, to sun visor assembly 10. Referring to FIG. 1, stiffening member 20 also includes a plurality of holes 28 therethrough that are configured to receive a plurality of tabs 30 (shown in FIG. 5) that are integrally formed with frame member 22. Depending on the length of sun visor assembly 10, stiffening member 20 may be substantially longer than frame member 22 and/or substantially similar in length to foundation 24. This feature advantageously allows frame member 22 to be substantially shorter than overall length of core 18, to overcome the readily deformable properties of plastic.

Figure 2:
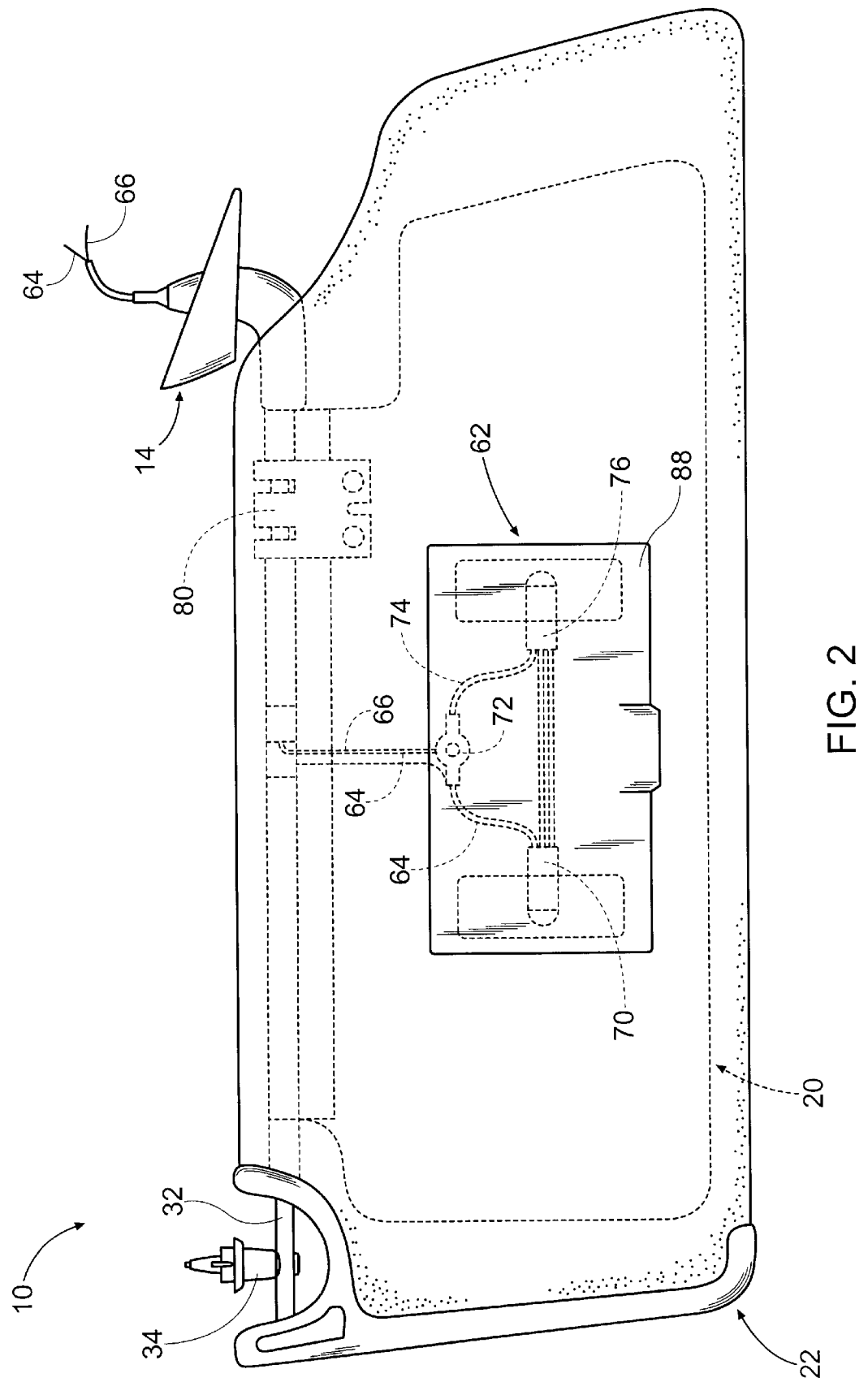
FIG. 2 is a front plan view of the sun visor assembly shown in FIG. 1.
Figure 3:
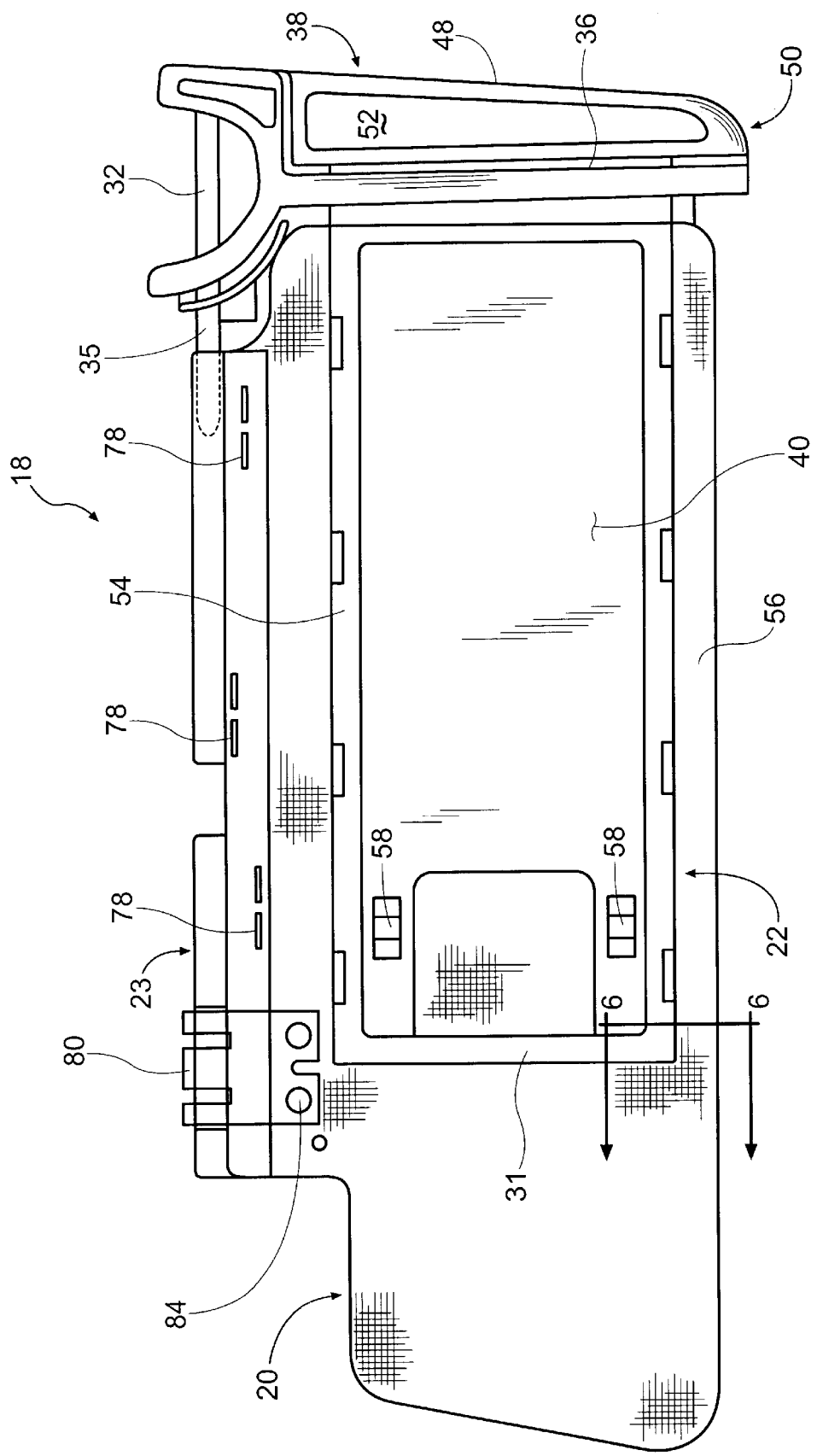
FIG. 3 is a rear plan view of the core illustrated in FIG. 1 with an optional extender blade shown in a stored position.

Referring to FIGS. 3 and 4, frame member 22, which is preferably manufactured of ABS or other suitable plastic, includes a frame 31 and an integrally formed pin member 32 that detachably secures sun visor assembly 10 to a retainer clip 34, as illustrated in FIG. 2. Frame member 22 includes an integrally formed support rod 35, positioned proximate pin member 32, that engages shaft holder 23 to structurally tie frame member 22 and shaft holder 23 together. The inclusion of pin member 32 into frame member 22, and the interconnection between frame member 22 and shaft holder 23 via support rod 35, advantageously provides the structural integrity needed to substantially prevent torsional deformation of sun visor assembly 10 during movement between the storage position and one of the use positions.

Figure 8:
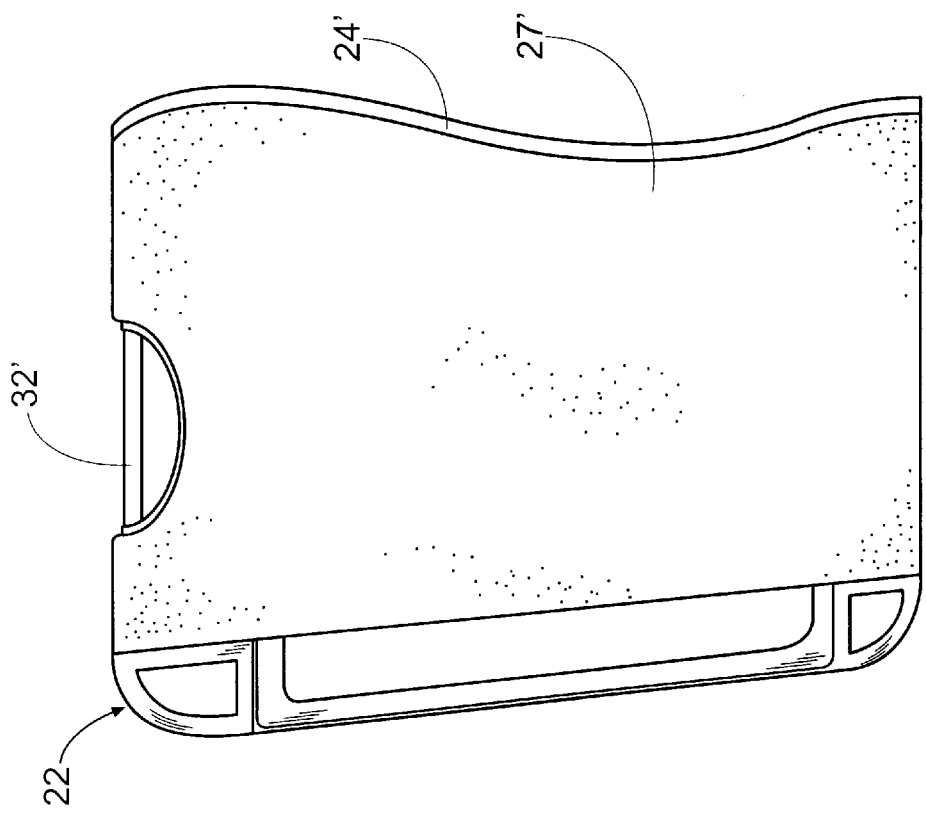
FIG. 8 is partial front plan view showing the foundation and upholstery cover disposed over the frame member of FIG. 7.
Figure 7:
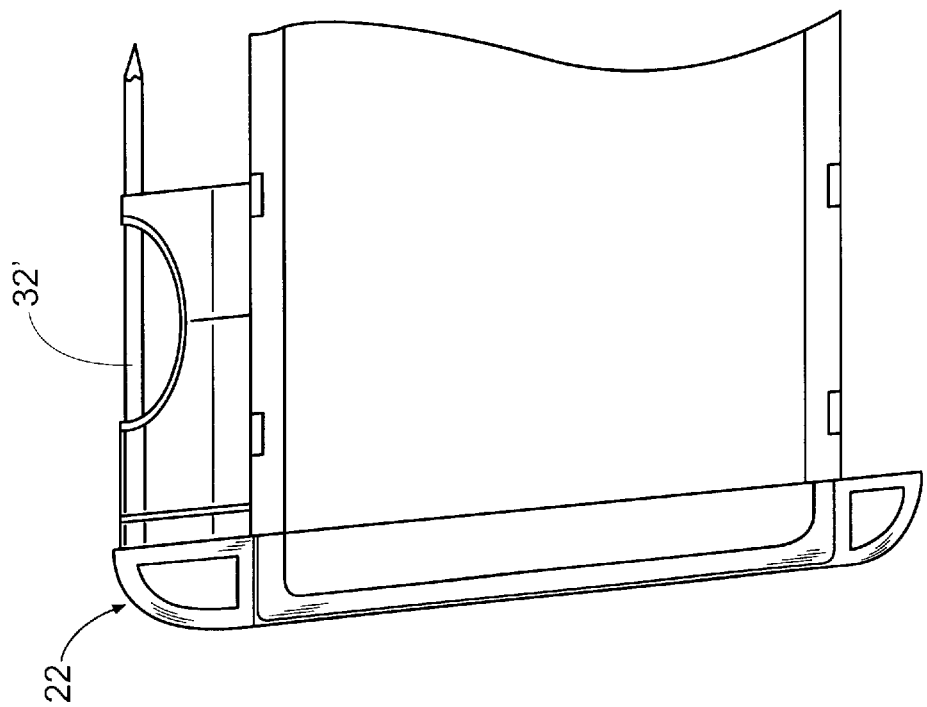
FIG. 7 is partial front plan view of a frame member according to another alternate embodiment of the present invention.

As illustrated in FIGS. 1 and 2, foundation 24 and upholstery cover 27 are disposed over core 18 such that an edge portion 33 of frame member 22 is left exposed. In a preferred embodiment of the present invention, foundation 24 and upholstery cover 27 are disposed around pin member 32 allowing the portion of frame member 22 that surrounds pin member 32 to remain exposed, as illustrated in FIG. 2. An advantage of having foundation 24 and upholstery cover 27 disposed around pin member 32, as in FIG. 2, is that a hole does not need to be cut in foundation 24 to accommodate pin member 32, which eliminates a manufacturing step. Alternatively, as illustrated in the embodiment of FIGS. 7 and 8, foundation 24' and upholstery cover 27' may be disposed over pin member 32', giving sun visor assembly 10' a more traditional look.

Optionally, frame 31 may also include an opening 36 for receiving an extender blade 38 therein, as illustrated in FIGS. 3 and 4. Extender blade 38 is a generally rectangular-shaped, molded plastic piece that includes a substantially planar body portion 40 having a top edge 42, a bottom edge 44, a captured end 46 and a free end 48. The top and bottom edges 42, 44 are preferably rounded having a radius of at least 3.2 mm to satisfy passenger safety regulations promulgated by international automotive authorities. Extender blade 38 is further provided with a handle portion 50. Handle portion 50 may be provided with a decorative channel 52 or other contour molded therein.

Top edge 42 and bottom edge 44 of extender blade 38 fit within a pair of tracks 54 and 56 molded into frame 31. Tracks 54 and 56 cooperate to slidingly retain extender blade 38. Captured end 46 of extender blade 38 preferably includes at least one protrusion 58 that travels freely between tracks 54, 56. When extender blade 38 is fully extended, as illustrated in FIG. 4A, protrusions 58 catch on frame 31 to prevent extender blade 38 from becoming disengaged from tracks 54, 56.

Figure 6B:
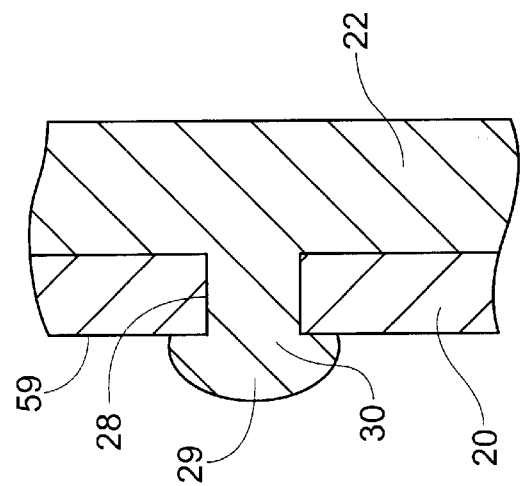
FIG. 6B is a cross-sectional view of the core along the lines 6—6 in FIG. 3 after assembly of the frame member and the stiffening member.
Figure 6A:
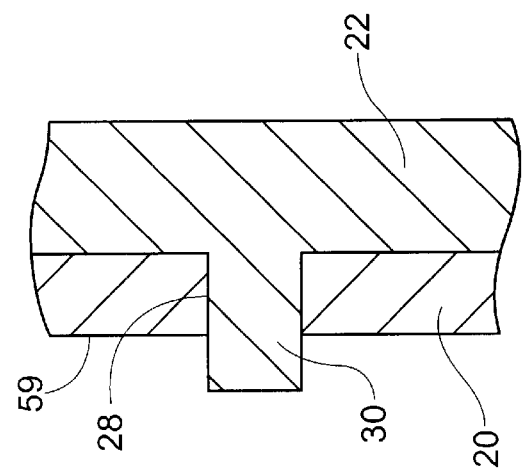
FIG. 6A is a cross-sectional view of the core along lines 6—6 in FIG. 3 during assembly of a frame member and a stiffening member.

Once frame member 22 is assembled onto stiffening member 20, a portion of tabs 30 protrude out of a front side 59 of stiffening member 20, as shown in FIG. 6A. Referring to FIG. 6B, the portion of tabs 30 that protrude out of holes 28 in stiffening member 20 are heat-staked, i.e., melted under heat and/or pressure, so that a head 29 is formed on the end of tabs 30 that is wider than the holes 28. The heat-staked tabs 30 secure frame member 22 and stiffening member 20 together to integrally form core 18.

Referring again to FIG. 1, one side of foundation 24 is preferably provided with an aperture 60 for receiving a vanity mirror assembly 62. Aperture 60 is positioned underneath cover 27. A pair of electrically conductive wires 64 and 66, which are preferably housed in a wire harness, extend from shaft holder 23 to mirror assembly 62. One end of each wire 64, 66 extends through shaft 16 and mounting bracket assembly 14 where they are connected to a source of electrical power in the vehicle. The other end of each wire 64, 66 is routed between stiffening member 20 and foundation 24 and is channeled through aperture 60 in foundation 24 and a slit 67 in cover 27 for connection to mirror assembly 62.

As illustrated in shadow in FIG. 2, within mirror assembly 62, wire 64 is connected to a first illumination device 70, such as an incandescent bulb or LED pad, and wire 66 is connected to a switch 72. Another wire 74 extends from switch 72 to a second illumination device 76 that is preferably substantially similar to illumination device 70. Additional wires are provided between illumination devices 70 and 76 to complete the circuit, as is known in the art.

Figure 5:
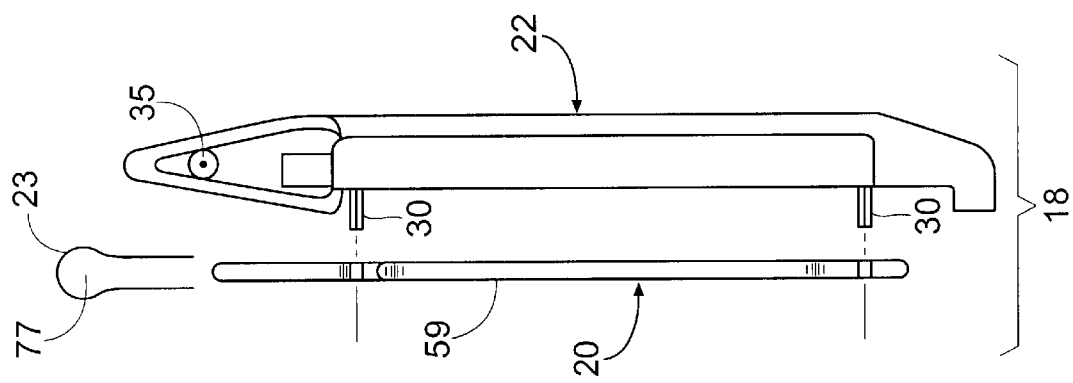
FIG. 5 is a partially exploded side elevational view of the core shown in FIG. 1.

Assembly of sun visor 10 will now be described in detail with reference to FIGS. 1–6B. Once frame member 22 and stiffening member 20 have been properly assembled as described above, shaft holder 23 is secured to stiffening member 20. Support rod 35 is inserted into a longitudinally extending channel 77 (as best seen in FIG. 5) in shaft holder 23 as shaft holder 23 is slid onto stiffening member 20. Referring to FIG. 3, shaft holder 23 is preferably secured to stiffening member 20 using a plurality of stapes 78. However, the method of attachment is not intended to be so limited, and other suitable fastening means, such as rivets or glue, may be employed to secure shaft holder 23 to stiffening member 20.

Referring to FIG. 1, a generally U-shaped detent clamp 80 is then secured to stiffening member 20 about a recess 82 in shaft holder 23, to surround a portion of support shaft 16. Detent clamp 80 is retained on stiffening member 20 by rivets 84 or other suitable fasteners. Support shaft 16 has one or more flats (not illustrated) that cooperate with detent clamp 80 to hold/lift sun visor assembly 10 in the storage position.

Vanity mirror assembly 62 is prepared by assembling a hinged cover or door 88 to a mirror frame 90 via spring-like members 92, as illustrated in FIG. 1. When door 88 is in the closed position, an actuator pin 94 attached to switch 72 is depressed by the door 88 thereby opening an electrical circuit. When door 88 is in the open position, exposing a mirror 96, pin 94 moves outwardly under the biasing force of a resilient member, such as a compression spring or the like, thereby closing the electrical circuit to energize illumination devices 70 and 76.

Cover 27 is then folded over foundation 24 and is adhered to foundation 24 around periphery 26. Vanity mirror assembly 62 is then secured to core 18 such that a portion of the foundation 24 is sandwiched therebetween. A rear face 98 of mirror assembly 62 preferably includes a plurality of integrally formed tabs 100, which are substantially similar to tabs 30, that extend outwardly from mirror frame 90. Tabs 100 are configured in length and position to extend through a plurality of holes 102 in cover 27 and foundation 24 and a plurality of similarly aligned holes 104 positioned in stiffening member 20. A portion of tabs 100 that protrude through the holes 104 in stiffening member 20 are heat-staked in a manner described above. This method of attaching mirror assembly 62 to sun visor assembly 10 substantially prevents movement of core 18 within foundation 24 after assembly. Once mirror assembly 62 has been properly assembled onto core 18, foundation 24 is folded over core 18 and is secured to itself in the manner previously described above.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A sun visor assembly comprising:
   a core having a peripheral edge, the core including a stiffening member and a frame member having an integrally formed pin member to detachably secure the sun visor to a retainer clip;
   a foundation disposed over the core, at least a portion of the foundation extending beyond the peripheral edge of the core to define an edge of the sun visor; and
   an upholstery cover covering the foundation and forming an exterior surface of the sun visor.

2. The sun visor assembly of claim 1, wherein a mirror assembly is secured to the stiffening member such that a portion of the foundation is sandwiched therebetween to substantially prevent movement of the core within the foundation after assembly.

3. The sun visor assembly of claim 1, wherein the stiffening member is substantially the same length as the foundation.

4. A sun visor assembly comprising:
   a core having a peripheral edge, the core comprising a stiffening member and an frame member having an integrally formed pin member to detachably secure the sun visor to a retainer clip;
   a shaft holder secured to the stiffening member for receiving a support shaft therein;
   a foundation folded over the core member and fastened to itself to secure the core substantially within the foundation, at least a portion of the foundation extending beyond the peripheral edge of the core to define an edge of the sun visor;
   an upholstery cover covering the foundation and forming an exterior surface of the sun visor; and
   a mirror assembly secured to the stiffening member such that a portion of the foundation is sandwiched therebetween to substantially prevent movement of the core within the foundation after assembly.

5. The sun visor assembly of claim 4, wherein a detent clamp is secured to the stiffening member over the shaft holder to yieldably resist rotation of the sun visor about the support shaft.

6. The sun visor assembly of claim 4, wherein the shaft holder is stapled to the stiffening member.

7. The sun visor assembly of claim 4, wherein the shaft holder defines a longitudinally extending channel.

8. The sun visor assembly of claim 7, wherein the frame member includes a support rod that is received in the longitudinally extending channel.

9. The sun visor assembly of claim 4, wherein the mirror assembly is heat-staked to the stiffening member.

10. A sun visor assembly, comprising:
    a core having a peripheral edge, the core comprising a stiffening member secured to a frame member, the frame member including a channel defined by a pair of tracks for receiving a extender plate therein, an integrally formed pin member to detachably secure the sun visor to a retainer clip and a support rod;
    a shaft holder secured to the stiffening member, the shaft holder including a longitudinally extending channel for receiving the support rod and at least a portion of the pin member therein;
    a foundation folded over the core and fastened to itself to secure the core substantially within the foundation, at least a portion of the foundation extending beyond the peripheral edge of the core to define an edge of the sun visor;
    an upholstery cover covering the foundation and forming an exterior surface of the sun visor; and
    a mirror assembly secured to the stiffening member such that a portion of the foundation and upholstery cover are sandwiched therebetween to substantially prevent movement of the core within the foundation after assembly.

11. A sun visor assembly comprising:
    a core having a peripheral edge, the core including a stiffening member and a frame member having an integrally formed pin member to detachably secure the sun visor to a retainer clip;
    a shaft holder secured to the stiffening member for receiving a support shaft;
    a foundation disposed over the core, at least a portion of the foundation extending beyond the peripheral edge of the core to define an edge of the sun visor; and
    an upholstery cover covering the foundation and forming an exterior surface of the sun visor.

12. The sun visor assembly of claimed 11, wherein a detent clamp is secured to the stiffening member over the shaft holder to yieldably resist rotation of the sun visor about the support shaft.

13. The sun visor assembly of claim 11, wherein the shaft holder is stapled to the stiffening member.

14. The sun visor assembly of claim 11, wherein the shaft holder defines a longitudinally extending channel.

15. The sun visor assembly of claim 14, wherein the frame member includes a support rod that is received in the longitudinally extending channel.

16. A sun visor assembly comprising:
- a core having a peripheral edge, the core including a stiffening member and a frame member having an integrally formed pin member to detachably secure the sun visor to a retainer clip;
- a foundation disposed over the core, at least a portion of the foundation extending beyond the peripheral edge of the core to define an edge of the sun visor;
- a mirror assembly heat-staked to the stiffening member such that a portion of the foundation is sandwiched therebetween to substantially prevent movement of the core within the foundation after assembly; and
- an upholstery cover covering the foundation and forming an exterior surface of the sun visor.

* * * * *